3,187,003
ZWITTERIONS OF 1-(2-AMINOETHYL-
IMIDAZOLINES)
Joseph J. McBride, Jr., La Grange, Ill., assignor to
Armour and Company, Chicago, Ill., a corporation of
Delaware
No Drawing. Filed June 19, 1961, Ser. No. 117,802
5 Claims. (Cl. 260—309.6)

This invention relates to the preparation of zwitterions of 1-(2-aminoethylimidazolines), and more particularly to the preparation of a series of new compounds comprising the zwitterions of 1-(2-aminoethyl)-2-substituted imidazolines and methods of preparing the same. The compounds are useful as fuel oil stabilizers, grease additives, fabric anti-static agents, and other uses.

An object of the invention is to provide new compounds which comprise the zwitterions of 1-(2-aminoethyl)-2-substituted imidazoline and a process for preparing the same. A further object is to provide a process in which an imidazoline is reacted with an alpha-B-unsaturated acid for the production of a series of new compounds having important new uses. Yet another object is to provide a crotonic acid zwitterion of 1-(2-aminoethyl)-2 - heptadecenyl imidazoline and a novel method for producing the same. Other specific objects and advantages will appear as the specification proceeds.

In one embodiment of my invention, I prepare the imidazoline having an aminoethyl substituent and react the imidazoline with an alpha-B-unsaturated acid, preferably using an excess of the unsaturated acid and heating the same to reaction temperature until the reaction is substantially complete. In order to prepare the imidazoline having an aminoethyl substituent, it is necessary to employ diethylene triamine. The imidazoline is prepared from diethylene triamine and a fatty acid, a resin acid, an aromatic acid, or a heterocyclic acid. The fatty acid may have from 12 to 22 carbon atoms and may be saturated or unsaturated, examples being lauric, oleic, and behenic acids. Abietic acid is an example of resin acids that may be used. Benzoic acid is an example of aromatic acids which may be used. Indoxylic and furoic acids are examples of heterocyclic acids which may be used.

Any alpha-B-unsaturated acid may be used to form the zwitterion. Specific examples are acrylic, methacrylic and crotonic acids.

Specific examples of the process and products may be set out as follows:

*Example I*

A crotonic acid zwitterion of 1-(2-aminoethyl)-2-heptadecenyl imidazoline was prepared by mixing 1-(2-aminoethyl)-2-heptadecenyl imidazoline with a 2% excess of crotonic acid to give a 61% solids mixture in hexylene glycol and refluxing for 48 hours.

The product has the following molecular configuration:

$$\text{—OOCCH}_2\text{—}\underset{\underset{H}{|}}{\overset{\overset{CH_3}{|}}{C}}\text{—H}_2\text{N}^+\text{—C}_2\text{H}_4\text{—}\underset{|}{\overset{|}{N}}\underset{CH_2}{\overset{\diagup N \diagdown}{\underset{|}{\overset{R-C}{\diagdown \diagup}}}} \underset{CH_2}{|}$$

where R is an aliphatic hydrocarbon having from 12 to 22 carbon atoms, an alicyclic hydrocarbon group, an aromatic group or a heterocyclic group.

*Example II*

The process was carried out as described in Example I except that acrylic acid was employed instead of crotonic acid.

*Example III*

The process was carried out as described in Example I except that methacrylic acid was empolyed instead of crotonic acid.

In other specific examples, lauric acid and oleic acid and behenic acid were employed with diethylene triamine in forming the imidazoline. Similarly, abietic acid, benzoic acid, indoxylic acid and furoic acid can be employed with diethylene triamine in forming the imidazoline.

While, in the foregoing specification, I have set forth specific materials and procedural steps in considerable detail for the purpose of illustrating my invention, it will be understood that such details may be modified widely by those skilled in the art without departing from the spirit of my invention.

I claim:

1. A process for preparing zwitterions of 1-(2-aminoethyl)-2-heptadecenyl imidazoline, comprising mixing 1-(2-aminoethyl)-2-heptadecenyl imidazoline with a 2% excess of an alpha-B-unsaturated carboxylic acid selected from the group consisting of crotonic, acrylic, and methacrylic acid, and heating the mixture to reaction temperature until the reaction is substantially complete.

2. A process for preparing the crotonic acid zwitterion of 1-(2-aminoethyl)-2-heptadecenyl imidazoline comprising mixing 1-(2-aminoethyl)-2-heptadecenyl imidazoline with a 2% excess of crotonic acid to give about a 61% solids mixture in hexylene glycol and refluxing for about forty-eight hours.

3. The inner zwitterion of N-[2-(2-heptadecenyl-2-imidazolin-1-yl)ethyl]-B-aminobutyric acid.

4. The inner zwitterion of N-[2-(2-heptadecenyl-2-imidazolin-1-yl)ethyl]-B-aminopropionic acid.

5. The inner zwitterion of N-[2-(2-heptadecenyl-2-imidazolin-1-yl)ethyl]-B-amino-α-methylpropionic acid.

References Cited by the Examiner

UNITED STATES PATENTS

| | | | |
|---|---|---|---|
| 2,268,273 | 12/41 | Wilkes et al. | 260—309.6 |
| 3,528,379 | 10/50 | Mannheimer | 260—309.6 |
| 2,659,731 | 11/53 | Luvisi | 260—309.6 |
| 2,820,043 | 1/58 | Rainey et al. | 260—309.6 |
| 2,926,108 | 2/60 | Andersen | 117—127 |

FOREIGN PATENTS 430,283   6/35   Great Britain.

OTHER REFERENCES

Bergman: The Chemistry of Acetylene and Related Compounds, page 80, N.Y., Interscience, 1948.

Cheronis et al.: Semimicro Qualitative Organic Analysis, 2nd Ed., page 3, N.Y. Interscience, 1947.

The Condensed Chemical Dictionary, 5th Edition, page 941, N.Y., Reinhold, 1956.

Fieser et al.: Organic Chemistry, 2nd Ed., pages 437–440, Boston, Heath, 1950.

(Other references on following page)

OTHER REFERENCES

Johnson et al.: Jour. Amer. Chem. Soc., vol. 71, pages 1901–1905 (1949)

McElvain: The Characterization of Organic Compounds, Revised Ed. pages 1–4, N.Y., Macmillan, 1953.

Shriner et al.: The systematic Identification of Organic Compounds, 4th Ed., page 1, N.Y., Wiley, 1956.

Skau et al.: Determination of Melting and Freezing Temperatures, in Weissberger Physical Methods of Organic Chemistry, Part I, 3rd Ed., page 288 (volume 1, Part I, of Technique of Organic Chemistry), N.Y., Interscience, 1959.

Stork et al.: Jour. Amer. Chem. Soc., vol. 69, pages 971–2 (1947).

Wagner et al.: Synthetic Organic Chemistry, pages 672–673, N.Y., Wiley, 1953.

Wagner et al.: Synthetic Organic Chemistry (New York, 1953), pp. 666–670.

Morton: The Chemistry of Heterocyclic Compounds, p. VI of the preface, N.Y., McGraw-Hill, 1946.

IRVING MARCUS, *Primary Examiner.*

D. T. McCUTCHEN, NICHOLAS S. RIZZO, WALTER A. MODANCE, *Examiners.*